(12) United States Patent
Bickham et al.

(10) Patent No.: US 9,470,841 B2
(45) Date of Patent: Oct. 18, 2016

(54) MULTICORE OPTICAL FIBER WITH MULTIMODE CORES

(71) Applicant: Corning Incorporated, Corning, NY (US)

(72) Inventors: Scott Robertson Bickham, Corning, NY (US); Douglas Llewellyn Butler, Painted Post, NY (US); Ming-Jun Li, Horseheads, NY (US)

(73) Assignee: Cornning Incorporated, Corning, NY (US)

( * ) Notice: Subject to any disclaimer, the term of this patent is extended or adjusted under 35 U.S.C. 154(b) by 158 days.

(21) Appl. No.: 14/546,051

(22) Filed: Nov. 18, 2014

(65) Prior Publication Data

US 2015/0160408 A1     Jun. 11, 2015

Related U.S. Application Data

(60) Provisional application No. 61/912,704, filed on Dec. 6, 2013.

(51) Int. Cl.
*G02B 6/02* (2006.01)
*G02B 6/028* (2006.01)
*G02B 6/036* (2006.01)

(52) U.S. Cl.
CPC ......... *G02B 6/02042* (2013.01); *G02B 6/0288* (2013.01); *G02B 6/03633* (2013.01)

(58) Field of Classification Search
None
See application file for complete search history.

(56) References Cited

U.S. PATENT DOCUMENTS

2011/0274398 A1* 11/2011 Fini .................. G02B 6/0365
                                                         385/124

2012/0183304 A1   7/2012 Winzer et al.
2014/0153883 A1*  6/2014 Mukasa ............. G02B 6/02042
                                                         385/100

FOREIGN PATENT DOCUMENTS

| WO | 2011/112846 | 9/2011 |
| WO | 2012161809 | 11/2012 |
| WO | 2014025614 | 2/2014 |

OTHER PUBLICATIONS

Shoichiro Matsuo et al., "12-core fiber with one ring structure for extremely large capacity transmission", Optics Express, vol. 20, No. 27, pp. 28398-28408.
International Search Report, issued in connection with corresponding PCT application No. PCT/US2014/068018, Sep. 11, 2015.
B. Zhu, T. F. Taunay, M. F. Yan; M. Fishteyn, G. Oulundsen, and D. Vaidya, "70-Gb/s multicore multimode fiber transmissions for optical data links," IEEE Photon. Technol. Lett., vol. 22, No. 22, pp. 1647-1649, Nov. 2010.
B. Lee et al., "End-to-End Multicore Fiber Optic Link Operating up to 120 Gb/s," J. Lightwave Technol., vol. 30, pp. 886-892 (Mar. 2012).
B. Lee et al., "120-Gb/s 100-m Transmission it a Single Multicore Multimode Fiber Containing Six Cores Interfaced with a Matching VCSEL Array," Paper TuD4.4, OFC 2012.

* cited by examiner

*Primary Examiner* — Hemang Sanghavi
(74) *Attorney, Agent, or Firm* — Kevin L. Bray

(57) ABSTRACT

Multicore optical fibers that include between two and ten multimode cores surrounded by a cladding matrix and symmetrically arranged about a fiber axis are disclosed, with no core running along the fiber axis. The cores include a trench to stabilize delays of the higher order modes, which tend to propagate faster than do the central modes due to the amount of power at the core-clad interface. The trench also suppresses crosstalk and power leakage. The core configuration promotes efficient optical alignment and optical coupling with other multicore optical fibers or light sources, such as VSCEL and silicon-photonics light sources.

19 Claims, 6 Drawing Sheets

100 µm

MULTICORE OPTICAL FIBER WITH MULTIMODE CORES

This application claims the benefit of priority under 35 U.S.C. §119 of U.S. Provisional Application Ser. No. 61/912,704 filed on Dec. 6, 2013, the content of which is relied upon and incorporated herein by reference in its entirety.

FIELD

The present disclosure relates to multicore optical fibers, and in particular relates to multicore optical fibers having multimode cores.

BACKGROUND

Optical fibers are used in a variety of telecommunications applications, including high-capacity data transmission for networks, data centers and server clusters. Conventional high-capacity optical-fiber links typically include cables (e.g., ribbon cables) that include conventional single-core multimode optical fibers, with each fiber carrying a single data channel. Unfortunately, such cables are limited in their connection density and tend to be bulky.

Multicore optical fibers ("multicore fibers") have been developed in part to provide higher data capacity. A multicore fiber has multiple cores embedded in a single cladding, and these cores tend to be single-mode cores with diameters less than 10 microns. Multicore fibers thus promise higher density connections as well as greater data capacity than do conventional fibers. However, multicore fibers tend to be difficult to use in high-capacity data transmission applications since the cores are fixed in place and each core needs to be aligned with high accuracy to a corresponding optical transmitter or optical receiver.

SUMMARY

An aspect of the disclosure is a multicore optical fiber ("multicore fiber"). The multicore fiber has a cladding matrix that defines a fiber axis. The cladding matrix has a diameter DM in the range 120 µm≤DM≤220 µm. The multicore fiber also has a plurality of N multimode cores wherein 2≤N≤10. Each core is surrounded by the cladding matrix and has a central core axis that runs generally parallel to the fiber axis. None of the cores run along the fiber axis. The multimode cores are symmetrically arranged about the fiber axis with their central core axes at a radial distance RC. The multimode cores have a core pitch CP (center-to-center spacing) in the range 30 µm≤CP≤60 µm, with each multimode core having a core diameter $d_{CO}$ in the range 20 µm≤$d_{CO}$≤40 µm. Each multimode core includes an inner core having a radius $r_{CI}$ in the range 6 µm≤$r_{CI}$≤18 µm, a core α in the range 1.9≤α≤2.2 and a maximum core Δ of $Δ_0$ in the range 0.6%≤$Δ_0$≤1.9%. The inner core is surrounded by a trench having a relative refractive index $Δ_T$ in the range −0.7%≤$Δ_T$≤−0.1% and a width $δr_T$ in the range 1 µm≤$δr_T$≤6 µm. The trench is separated from the inner core by an inner cladding having a width $δr_{ICL}$ in the range 0.5 µm≤$δr_{ICL}$≤2 µm. In an example, the inner cladding width $δr_{ICL}$ is an optimum width $δr_{ICL-OPT}$ that is related to the inner core radius $r_{CI}$ and the relative refractive index of the trench $Δ_T$ by the formula $δr_{ICL-OPT}$=0.053 $r_{CI}$−0.586 $Δ_T$. In an example, the inner cladding width $δr_{ICL}$ is within 10% of the optimum width, i.e., is in the range defined by $(0.9)·δr_{ICL-OPT}$≤$δr_{ICL}$≤$(1.1)·δr_{ICL-OPT}$.

Another aspect of the disclosure is a multicore fiber. The multicore fiber has a plurality of N multimode cores for 4≤N≤8 arranged symmetrically about a fiber axis and surrounded by a uniform silica cladding matrix having a diameter DM in the range 120 µm≤DM≤220 µm. Each core has a central axis located at a radius RC from the fiber axis and has a core diameter $d_{CO}$ in the range 20 µm≤$d_{CO}$=40 µm. Each multimode core includes an inner core having a radius $r_{CI}$ in the range 6 µm≤$r_{CI}$≤18 µm, a core α in the range 1.9≤α≤2.2 and a maximum core Δ of $Δ_0$ in the range 0.6%≤$Δ_0$≤1.9%. The cores define a core pitch CP in the range 30 µm≤CP≤60 µm. Each core also includes an inner core, an inner cladding surrounding the inner core and a trench surrounding the inner cladding. None of the cores run along the fiber axis.

Another aspect of the disclosure is a multicore optical fiber that consists of: a plurality of N multimode cores for 4≤N≤8 arranged symmetrically about a fiber axis and surrounded by a uniform silica cladding matrix having a diameter DM in the range 120 µm≤DM≤220 µm, with each core having a central axis located at a radius RC from the fiber axis and having a core diameter $d_{CO}$ in the range 20 µm≤$d_{CO}$≤40 µm. Each multimode core includes an inner core having a radius $r_{CI}$ in the range 6 µm≤$r_{CI}$≤18 µm a core α in the range 1.9≤α≤2.2 and a maximum core Δ of $Δ_0$ in the range 0.6%≤$Δ_0$≤1.9%, the cores defining a pitch CP in the range 30 µm≤CP≤60 µm; and wherein each core consists of an inner core, an inner cladding surrounding the inner core and a trench surrounding the inner cladding.

The configuration of the individual cores and the arrangement of the cores within the cladding matrix serve to improve (as compared to single-mode cores) the optical coupling and alignment of the multicore optical fiber with either another multicore optical fiber or devices such as VCSELs and silicon-photonic emitters and receivers. The size of the multimode cores is larger than that of single-mode cores but is not as large as the typical multimode-core diameter of 50 µm. Thus, multimode cores with an inner core having a diameter in the range of 12 µm to 36 µm are expected to have a light-coupling efficiency of 15× to 30× greater than that of single-mode cores while also keeping the overall size of the multicore fiber relatively compact. Furthermore, the core pitch can be selected to generally match that of silicon-photonic devices and VCSEL light sources. The absence of a central core that runs down the fiber axis serves to maintain the symmetry of the multicore fiber so that all the cores have the same light-carrying properties and characteristics while the chance of cross-talk or other interference between the cores is also reduced. In addition, it is believed that skew, which is the difference in signal propagation time between fiber channels in synchronous parallel data transmission, will be minimized with this symmetric core configuration Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
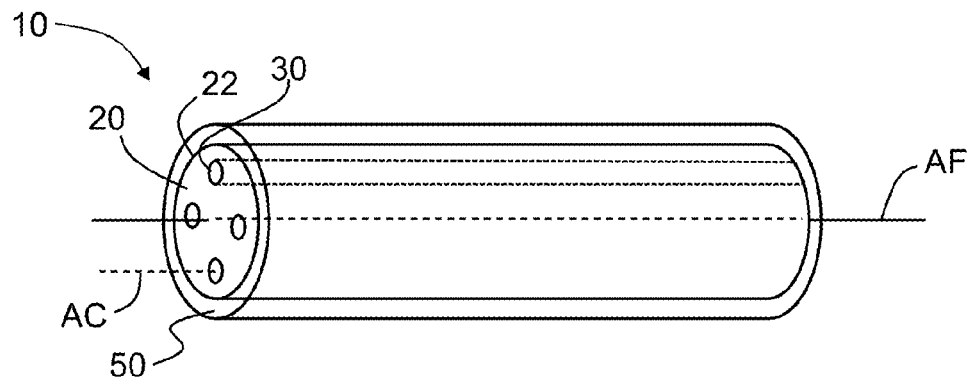
FIG. 1 is an isometric view of a section of an example multicore fiber according to the disclosure.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

The entire disclosure of any publication or patent document mentioned herein is incorporated by reference.

Cartesian coordinates are shown in some of the Figures for the sake of reference and are not intended to be limiting as to direction or orientation.

The term "relative refractive index," as used herein in connection with the multimode fibers and fiber cores discussed below, is defined as:

$$\Delta(r) = [n(r)^2 - n_{REF}^2)]/2n(r)^2,$$

where n(r) is the refractive index at radius r, unless otherwise specified. The relative refractive index is defined at the operating wavelength $\lambda_p$, which is the wavelength where the multimode core of the optical fiber is designed to work optimally, e.g., where the differential mode delay is minimized. In one aspect, the reference index $n_{REF}$ is silica glass. In another aspect, $n_{REF}$ is the maximum refractive index of the cladding matrix (introduced and discussed below). The refractive index $n_0$ is the maximum index of the index profile. In most cases, $n_0=n(0)$. As used herein, the relative refractive index is represented by $\Delta$ and its values are given in units of "%," unless otherwise specified. In cases where the refractive index of a region is less than the reference index $n_{REF}$, the relative refractive index is negative and is referred to below as a trench. The minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index.

The alpha parameter α as used herein relates to the relative refractive index A, which is in units of "%," where r is the radius (radial coordinate) of the fiber, and which is defined by:

$$\Delta(r) = \Delta_0 \left[ 1 - \left( \frac{r - r_m}{r_0 - r_m} \right)^\alpha \right],$$

where $r_m$ is the point at which $\Delta(r)$ is the maximum $\Delta_0$, $r_0$ is the point at which $\Delta(r)$% is zero and r is in the range $r_i \le r \le r_f$, where $\Delta(r)$ is defined above, $r_i$ is the initial point of the α-profile, $r_f$ is the final point of the α-profile and a is an exponent that is a real number. For a step index profile, α>10, and for a gradient-index profile, α<5. It is noted here that different forms for the core radius $r_0$ and maximum relative refractive index $\Delta_0$ can be used without affecting the fundamental definition of $\Delta$. For a practical fiber, even when the target profile is an alpha profile, some level of deviation from the ideal situation can occur. Therefore, the alpha parameter α for a practical fiber is obtained from a best fit of the measured index profile. An alpha parameter in the range 2.05≤α≤2.15 provides a minimum for the differential mode delay (DMD) at 850 nm and an alpha parameter in the range 1.95≤α≤2.05 provides a minimum for the DMD at 1300 nm.

The modal bandwidth (or overfill bandwidth) of an optical fiber is denoted BW and is defined herein as using overfilled launch conditions at 850 nm according to IEC 60793-1-41 (TIA-FOTP-204), "Measurement Methods and Test Procedures: Bandwidth." The minimum calculated effective modal bandwidths BW can be obtained from measured DMD spectra as specified by IEC 60793-1-49 (TIA/EIA-455-220), "Measurement Methods and Test Procedures: Differential Mode Delay." The units of bandwidth for an optical fiber can be expressed in MHz·km, GHz·km, etc., and a bandwidth expressed in these kinds of units is also referred to in the art as the bandwidth-distance product. The modal bandwidth is defined in part by modal dispersion. At the system level, the overall bandwidth can be limited by chromatic dispersion, which limits the system performance at a high bit rate.

The limits on any ranges cited herein are considered to be inclusive and thus to lie within the range, unless otherwise specified.

The numerical aperture or NA means the numerical aperture as measured using the method set forth in IEC-60793-1-43 (TIA SP3-2839-URV2 FOTP-177), "Measurement Methods and Test Procedures: Numerical Aperture."

Figure 2A:
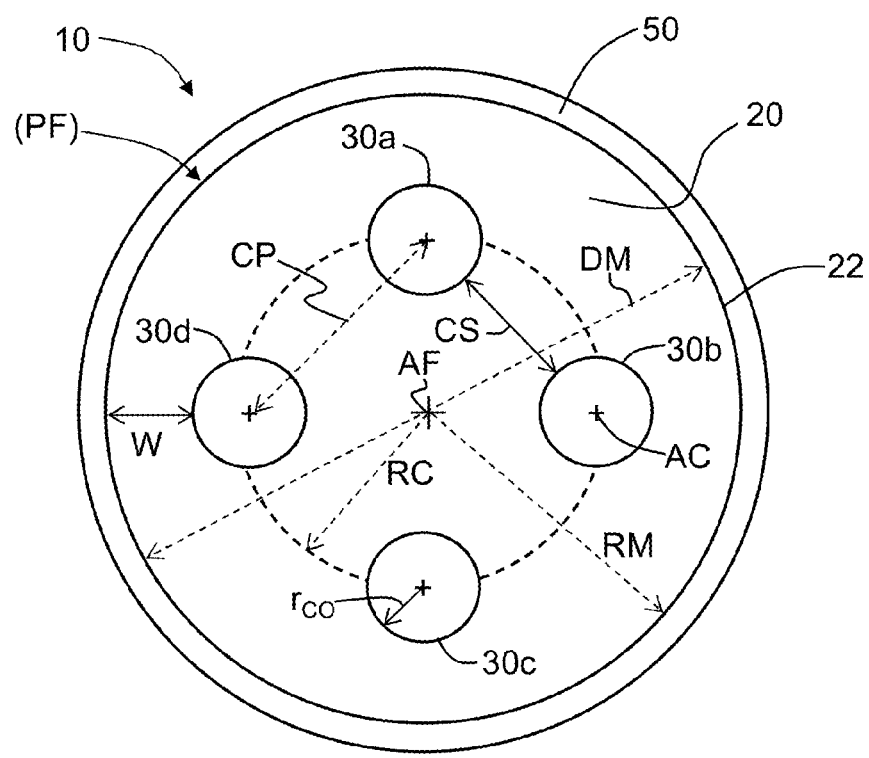
FIGS. 2A and 2B are front-on views of example multicore fibers according to the disclosure.
Figure 2B:
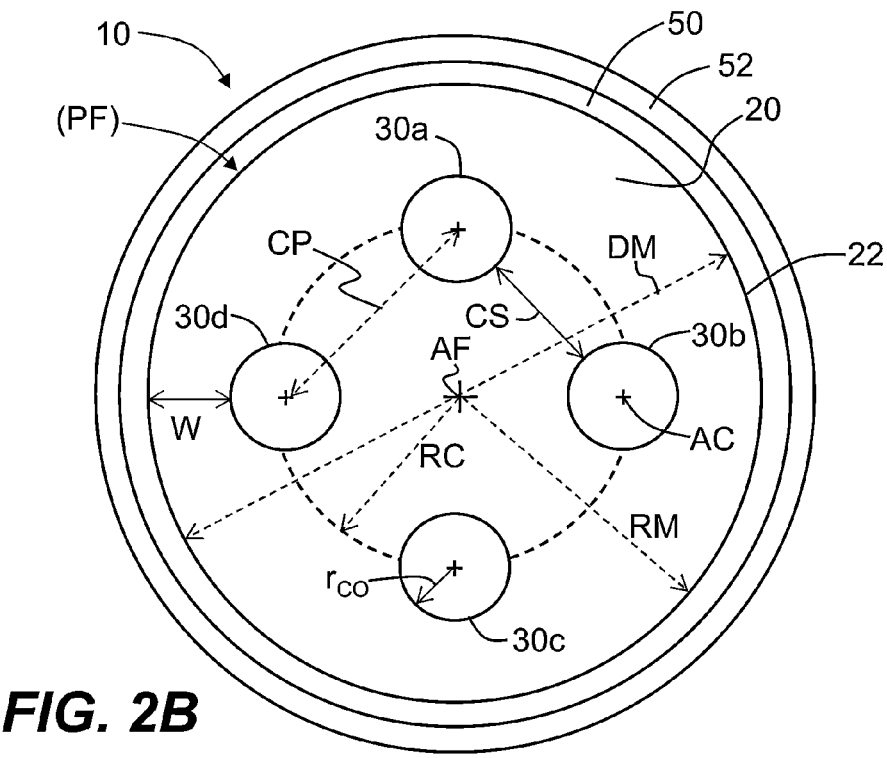

FIG. 1 is an isometric view of a section of a multicore fiber 10, and FIGS. 2A and 2B are front-on views of example multicore fibers according to the disclosure. The multicore fiber 10 includes a central fiber axis AF, a cladding matrix 20 with an outer surface 22 and a radius RM, and a plurality of multimode cores ("cores") 30 (individually denoted 30a, 30b, etc.) that run the length of the multicore fiber generally parallel to the central axis. Each core has a central axis AC, a radius $r_{CO}$ and a diameter $d_{CO}=2 \cdot r_{CO}$. Only one core 30 is shown as running the length of multicore fiber 10 in FIG. 1 for ease of illustration. There is no central core 30, i.e., there is no core that runs down the central fiber axis AF. In an example, cladding matrix 20 is uniform, i.e., it is made of a single material, such as pure (undoped) silica. The multicore fiber 10 has an operating wavelength $\lambda_p$.

FIG. 2A shows an example multicore fiber 10 having an outer coating 50 that contacts and surrounds outer surface 22 of cladding matrix 20. In an example, coating 50 has a Young's modulus of less than 1.0 MPa, preferably of less than 0.9 MPa and in preferred embodiments of not more than 0.8 MPa. In another example illustrated in FIG. 2B, multicore fiber 10 includes coating 50 as a primary coating and a secondary coating 52 that contacts and surrounds the primary coating. In an example, secondary coating 52 has a Young's modulus of greater than 1,200 MPa and in other embodiments of greater than 1,400 MPa.

As used herein, the Young's modulus, elongation to break, and tensile strength of a cured polymeric material of a primary coating is measured using a tensile testing instrument (e.g., a Sintech MTS Tensile Tester or an INSTRON Universal Material Test System) on a sample of a material shaped as a film between about 0.003" (76 microns) and 0.004" (102 microns) in thickness and about 1.3 cm in width, with a gauge length of 5.1 cm and a test speed of 2.5 cm/min. Additional description of suitable primary and secondary coatings 50 and 52 can be found in PCT Publication WO2005/010589.

The cores 30 are arranged symmetrically about central fiber axis AF with core axes AC located at a radius RC<RM and have a center-to-center spacing CP. The cores 30 have an alpha parameter $\alpha$ and a relative refractive index $\Delta$ ("core $\Delta$") as described in greater detail below. The cores 30, in combination with the surrounding cladding matrix 20, define a core numerical aperture $NA_C$.

Figure 3:
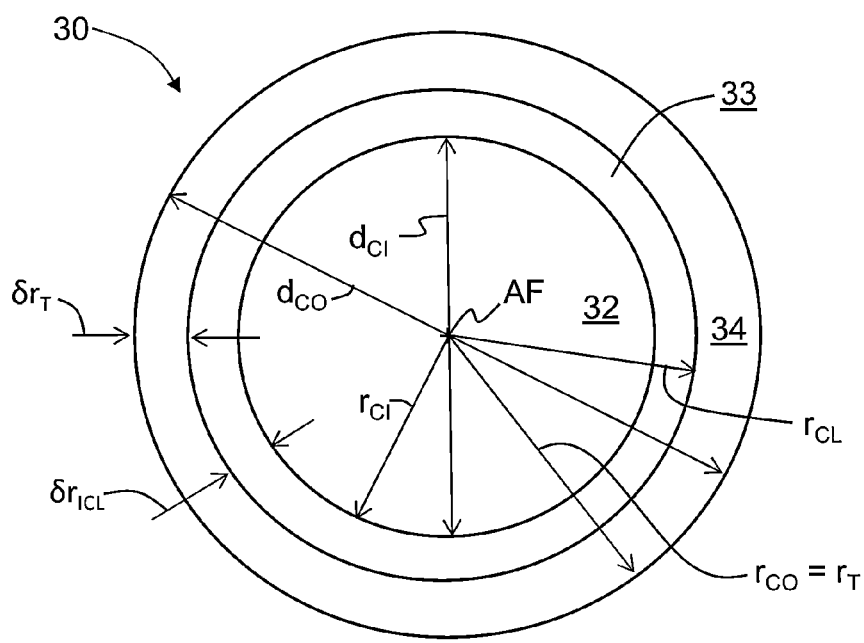
FIG. 3 is a close-up front-end view of an example core used in the multicore fiber disclosed herein.
Figure 4:
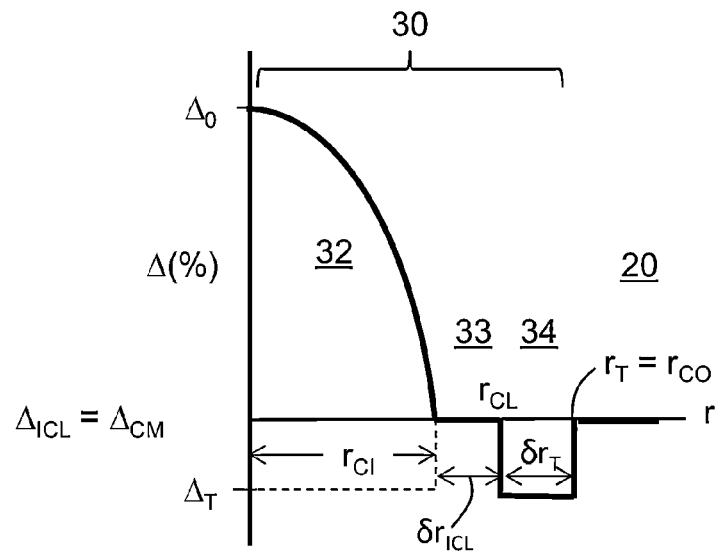
FIG. 4 is a plot of the core $\Delta$(%) versus core radius r (no units) showing relative refractive indices of the inner core, the inner cladding and the trench surrounding the inner cladding.

FIG. 3 is a close-up front-end view of an example core 30. The core 30 includes an inner core 32, an inner cladding 33 that surrounds the inner core and a trench 34 that surrounds the inner cladding. FIG. 4 is a plot of the core $\Delta$ versus core radius r showing inner core 32, inner cladding 33 and trench 34 surrounding the inner cladding. The trench 34 has a relative refractive index $\Delta=\Delta_T$, while cladding matrix 20 has a relative refractive index $\Delta=\Delta_{CM}$. The trench 34 has a width $\delta r_T$ and an outer radius $r_T$. The inner cladding 33 has a relative refractive index $\Delta$ of $\Delta_{ICL}$, which is shown by way of example as being equal to $\Delta_{CM}$ of cladding matrix 20. The inner cladding 33 has an outer radius $r_{CL}$ and a width $\Delta r_{ICL}$.

In examples, the depth of trench 34, which is measured by the trench $\Delta$ of $\Delta_T$, satisfies $\Delta_T<-0.1\%$, or is in the range $-0.7\% \le \Delta_T \le -0.1\%$ or is in the range $-0.5\% \le \Delta_T \le -0.2\%$. Also in examples, the width $\delta r_T$ of trench 34 satisfies $\delta r_T \ge 1$ µm, or is in the range 1 µm$\le \delta r_T \le$6 µm or is in the range 2 µm$\le \delta r_T \le$5 µm.

As noted above, cores 30 are multimode, and trench 34 serves to equalize the delays of the higher order modes, which travel near the outer radius of the core and tend to propagate faster than the modes traveling in the center region of the multimode core due to the Goos-Hänchen effect. The trench also suppresses power leakage, which decreases macrobend losses compared to multimode cores that only have an inner core. In examples, the width $\delta r_{ICL}$ of inner cladding 33 is in the range 0.5 µm$\le \delta r_{ICL} \le$2.0 µm, or 0.6 µm$\le \delta r_{ICL} \le$1.5 µm or 0.8 µm$\le \delta r_{ICL} \le$1.2 µm. The optimum inner cladding width $\delta r_{ICL-OPT}$ is related to the inner core radius $r_{CI}$ and the relative refractive index $\Delta_T$ of the trench 34 by the formula $\delta r_{ICL-OPT}=0.053 \, r_{CI}-0.586 \, \Delta_T$. In examples, multimode core 30 has a high overfilled modal bandwidth when $|\delta r_{ICL}-\delta r_{ICL-OPT}| \le 0.3$ µm, or $|\delta r_{ICL}-\delta r_{ICL-OPT}| \le 0.2$ µm, or $|\delta r_{ICL}-\delta r_{ICL-OPT}| \le 0.1$ µm. Also in an example, the width $\delta r_{ICL}$ is within 10% of the optimum width, i.e., is in the range defined by $(0.9) \cdot \delta r_{ICL-OPT} \le \delta r_{ICL} \le (1.1) \cdot \delta r_{ICL-OPT}$.

The trench 34 also suppresses crosstalk and skew between cores 30. In some embodiments, the crosstalk between adjacent cores 30 is less than −30 dB, or less than −35 dB or less than −40 dB. In some example embodiments, the skew between any two cores 30 of multicore fiber 10 is less than 5 ps/m, or less than 2 ps/m, or less than 1 ps/m or less than 0.5 ps/m.

In an example embodiment, the number N of cores 30 can be $2 \le N \le 10$, and in a further example embodiment is $4 \le N \le 8$, and in a further example embodiment N=6.

Also in an example embodiment, the core diameter $d_{CO}$ is in the range 20 µm$\le d_{CO} \le$40 µm and the core $\alpha$ is in the range $1.9 \le \alpha \le 2.2$. Further in an example embodiment, the core $\alpha$ is in the range $2.05 \le \alpha \le 2.15$ for $\lambda_p=850$ nm or $\lambda_p$ in the range from 800 nm$\le \lambda_p \le$900 nm; or the core $\alpha$ is in the range $2.0 \le \alpha \le 2.1$ for $\lambda_p=980$ nm, $\lambda_p=1,060$ nm, or $\lambda_p$ in the range from 930 nm$\le \lambda_p \le$1110 nm; or the core $\alpha$ is in the range $1.95 \le \alpha \le 2.05$ for $\lambda_p=1,300$ nm or $\lambda_p$ in the range from 1250 nm$\le \lambda_p \le$1350 nm; or the core $\alpha$ is in the range $1.9 \le \alpha \le 2.0$ for $\lambda_p$ in the range from 1520 nm$\le \lambda_p \le$1620 nm.

Further in example embodiments, the maximum core $\Delta$, denoted $\Delta_0$, is in the range $0.6\% \le \Delta_0 \le 1.9\%$, or between $0.8\% \le \Delta_0 \le 1.3\%$ or $0.9\% \le \Delta_0 \le 1.2\%$ to enable respective numerical apertures $NA_C$ in the ranges $0.16 \le NA_C \le 0.26$, or $0.18 \le NA_C \le 0.24$ or $0.185 \le NA_C \le 0.215$.

Further in an example embodiment, multicore fiber 10 has a ratio between the inner core radius and inner cladding radius of $\rho=r_{CI}/r_{CL}=0.94$, which is the same as that of Corning® ClearCurve® multimode fiber. In other embodiments, $\rho$ is between 0.9 and 0.95, or between 0.91 and 0.94, or between 0.92 and 0.94. Also in an example embodiment, diameter DM=2·RM of cladding matrix 20 satisfies the condition DM$\le$220 µm, and further in an example is in the range 120 µm$\le$DM$\le$220 µm. In some embodiments, 150 µm$\le$DM$\le$220 µm, 160 µm$\le$DM$\le$200 µm or 170 µm$\le$DM$\le$180 µm. In other embodiments, diameter DM is in the range 120 µm$\le$DM$\le$150 µm, or 120 µm$\le$DM$\le$140 µm or 120 µm$\le$DM$\le$130 µm. Further in examples, the center-to-center core pitch CP is in the range 30 µm$\le$CP$\le$60 µm, or 30 µm$\le$CP$\le$45 µm or 45 µm$\le$CP$\le$60 µm.

Example Multicore Preforms and Fibers

The multicore fiber 10 is formed by drawing a multicore preform using standard optical-fiber fabrication techniques known in the art. A multicore preform can be made by using different methods, for example, glass drilling, or stacking methods. In the following examples, the glass drilling method was used to form a multicore preform. In this method, a silica glass cylinder substrate is drilled with holes with the dimensions and locations according to a multicore fiber design. Then core canes with a designed index profile and with a diameter slightly smaller than the hole diameter are inserted into the holes to form a multicore preform. The core canes can be made by conventional preform manufacturing methods such as OVD, MCVD or PCVD.

The design parameters for nine example multicore fibers 10 are set forth below in Tables 1, 2 and 3. In the Tables, "PF" stands for "preform" and "MCF" stands for "multicore fiber." In the design examples, it is assumed that the geometry of the fiber scales with the ratio of the fiber diameter over the preform diameter. The diameter of cladding matrix 20 is denoted DM while DH stands for "hole diameter" and corresponds to the core diameter $d_{CO}$, which is equal to 2·$r_T$, i.e., the outer diameter of trench 34. Thus, by way of example, a hole diameter DH=40 µm accommodates a core 30 with a diameter $d_{CO}$=30 µm ($r_{CO}$=15 µm), an inner cladding width $\delta r_{ICL}$=1.2 µm, and a trench width $\delta r_T$=3.8 µm.

The separation distance between the centers of cores 30 that lie along a line passing through central fiber axis AF is denoted DC=2·RC. The core radial distance measured from central fiber axis AF is thus RC. The core pitch CP is the center-to-center core spacing. The core spacing CS represents the edge-to-edge separation of adjacent cores 30 as measured along a line connecting the cores' respective central axes AC. The parameter W represents the spacing between the outer radii of the cores 30 and the outer edge (surface 22) of cladding matrix 20. The various design parameters are included for both the initial preform and the drawn multicore fiber 10. Note that FIGS. 2A and 2B can represent preform PF if the outer coating(s) is/are removed, and the reference symbol PF is included in parenthesis in FIGS. 2A and 2B to illustrate this point.

Four-Core Multicore Fiber Examples

Table 1 below sets forth the main design parameters for three example four-core multicore fibers 10 (Examples 1.1 through 1.3) and the corresponding preforms. For these four-core examples, the core pitch CP=(2)$^{0.5}$ RC. In the Tables below, "PAR" stands for "Parameter."

TABLE 1

THREE EXAMPLE FOUR-CORE MULTICORE FIBERS

| PAR | EXAMPLE 1.1 | | EXAMPLE 1.2 MCF | | EXAMPLE 1.3 | |
|---|---|---|---|---|---|---|
| | PF (mm) | MCF (µm) | PF (mm) | (µm) | PF (mm) | MCF (µm) |
| DM | 60.0 | 160.0 | 48.0 | 180.0 | 48.0 | 160.0 |
| DH | 15.0 | 40.0 | 10.0 | 37.5 | 10.0 | 33.3 |
| W | 7.5 | 20.0 | 6.7 | 25.0 | 5.1 | 17.0 |
| DC | 30.0 | 80.0 | 24.7 | 92.5 | 27.8 | 92.7 |
| RC | 15.0 | 40.0 | 12.3 | 46.3 | 13.9 | 46.3 |
| CP | 21.2 | 56.6 | 17.4 | 65.4 | 19.7 | 65.5 |
| CS | 8.6 | 22.8 | 9.4 | 35.1 | 11.8 | 39.4 |

In Example 1.2, for each core 30, inner core 32 has a diameter $d_{CI}$=30 µm, inner cladding has a width $\delta r_{ICL}$=1.0 µm, and trench 34 has a width $\delta r_T$=2.75 µm, so that each core has an outer diameter $d_{CO}$=37.5 µm.

Six-Core Multicore Fiber Examples

Figure 5:
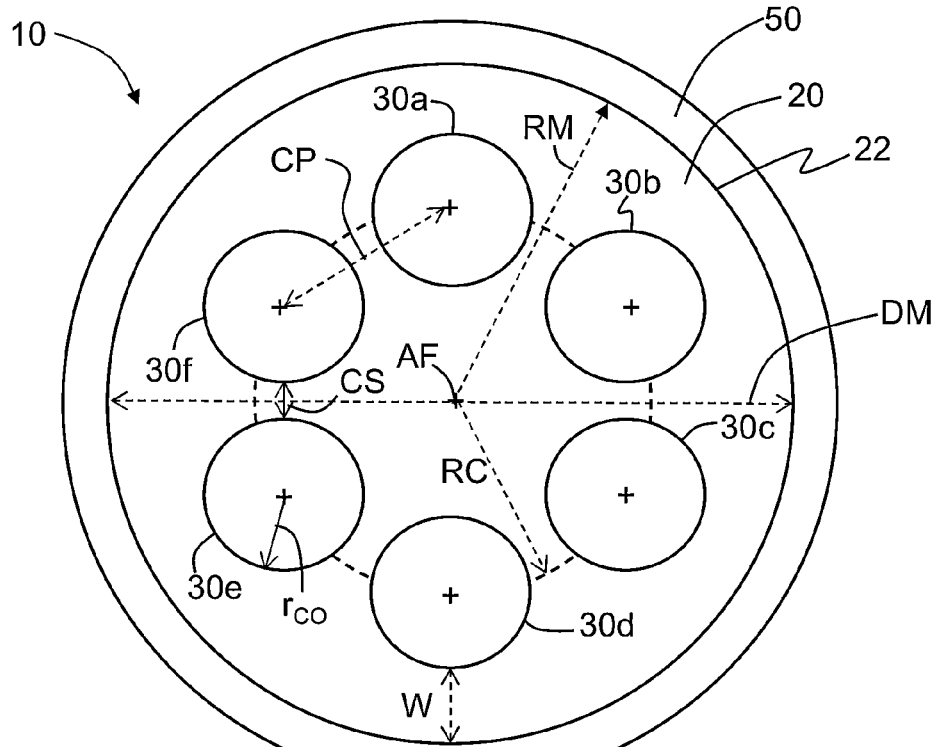
FIG. 5 is similar to FIG. 2A and shows an example multicore fiber having six cores.

FIG. 5 is similar to FIG. 2 and shows an example embodiment of a six-core multicore fiber 10 having cores 30a through 30f symmetrically arranged about fiber axis AF at radius RC. Table 2 sets forth the main design parameters for three example six-core multicore fibers 10 (Examples 2.1 through 2.3) and the corresponding preforms. For these six-core examples, the core pitch CP=RC.

TABLE 2

THREE EXAMPLE SIX-CORE MULTICORE FIBERS

| PAR | EXAMPLE 2.1 | | EXAMPLE 2.2 MCF | | EXAMPLE 2.3 | |
|---|---|---|---|---|---|---|
| | PF (mm) | MCF (µm) | PF (mm) | (µm) | PF (mm) | MCF (µm) |
| DM | 48.0 | 125.0 | 60.0 | 155.0 | 55.0 | 190.0 |
| DH | 10.0 | 26.0 | 10.0 | 25.8 | 10.0 | 34.5 |
| W | 5.8 | 15.0 | 11.6 | 30.0 | 7.5 | 26.0 |
| DC | 26.5 | 69.0 | 26.8 | 69.2 | 29.9 | 103.5 |
| RC | 13.2 | 34.5 | 13.4 | 34.6 | 15.0 | 51.7 |
| CP | 13.2 | 34.5 | 13.4 | 34.6 | 15.0 | 51.7 |
| CS | 5.8 | 15.1 | 6.0 | 15.6 | 8.5 | 29.4 |

The multicore fiber 10 of Example 2.1 has a diameter DM=125 µm, which is the same as that of a conventional multimode fiber. The holes have a diameter DH=26 µm, which is designed to accommodate respective cores 30, each having an inner core 32 of diameter $d_{CI}$=18 µm, an inner cladding 33 of width $\delta r_{ICL}$=1.2 µm and a trench width $\delta r_T$=2.8 µm.

Likewise, multicore fiber 10 of Example 2.3 has a core pitch CP=51.7 µm, and the cladding diameter DM=190 µm is designed to accommodate the larger pitch and the larger core size as compared to Examples 2.1 and 2.2. The holes have a diameter DH=$d_{CO}$=34.5 µm, which is designed to accommodate respective cores 30, each having an inner core 32 of diameter $d_{CI}$=26 µm, an inner cladding 33 of width $\delta r_{ICL}$=1.25 µm and a trench width $\delta r_T$=3 µm.

Eight-Core Multicore Fiber Examples

Figure 6:
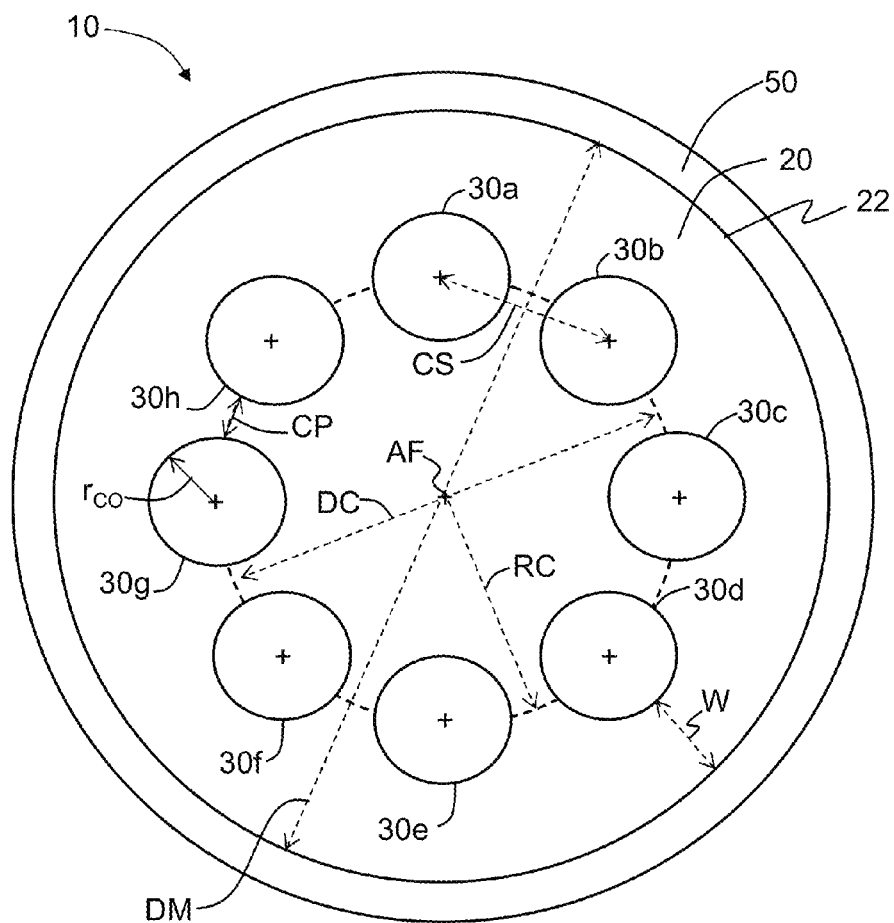
FIG. 6 is similar to FIG. 5 and shows an example multicore fiber having eight cores.

FIG. 6 is similar to FIG. 5 and shows an example embodiment of an eight-core multicore fiber 10 having cores 30a through 30h symmetrically arranged about fiber axis AF at radius RC. Table 3 sets forth the main design parameters for three example eight-core multicore fibers 10 (Examples 3.1 through 3.3) and the corresponding preforms. For these eight-core examples, the core pitch CP=(2)$^{0.5}$ RC/2.

TABLE 3

THREE EXAMPLE EIGHT-CORE MULTICORE FIBERS

| PAR | EXAMPLE 3.1 | | EXAMPLE 3.2 MCF | | EXAMPLE 3.3 | |
|---|---|---|---|---|---|---|
| | PF (mm) | MCF (µm) | PF (mm) | (µm) | PF (mm) | MCF (µm) |
| DM | 60.0 | 200.0 | 60.0 | 180.0 | 60.0 | 200.0 |
| DH | 10.0 | 33.3 | 10.0 | 30.0 | 10.0 | 33.3 |
| W | 6.0 | 20.0 | 6.7 | 20.0 | 7.5 | 25 |
| DC | 38.0 | 126.7 | 36.7 | 110.0 | 35.0 | 116.7 |
| RC | 19.0 | 63.3 | 18.3 | 55.0 | 17.5 | 58.3 |
| CP | 13.4 | 44.8 | 13.0 | 38.9 | 12.4 | 41.2 |
| CS | 9.8 | 32.8 | 8.8 | 26.4 | 7.5 | 25.0 |

The multicore fiber 10 of Example 3.2 has a diameter DM=180 µm and hole diameters DH=$d_{CO}$=30 µm designed to accommodate respective cores 30, each having an inner core 32 of diameter $d_{CI}$=20 µm, an inner cladding 33 of width $\delta r_{ICL}$=1.0 µm and a trench width $\delta r_T$=4 µm.

Example Multimode Cores

Tables 4 through 8 below set forth example design parameters for example multimode cores 30 for use in forming example multicore fibers 10. Table 4 sets forth example design parameters suitable for an operating wavelength $\lambda_p$=850 nm, Table 5 sets forth example design parameters suitable for an operating wavelength $\lambda_p$=980 nm, Table 6 sets forth example design parameters suitable for an operating wavelength $\lambda_p$=1060 nm, Table 7 sets forth example design parameters suitable for an operating wavelength $\lambda_p$=1300 nm and Table 8 sets forth example design parameters suitable for an operating wavelength $\lambda_p$=1550.

In Tables 4 through 8 below, the inner core radius $r_{CI}$, the trench inner radius $r_{CL}$, the inner cladding width $\delta r_{ICL}$, the trench outer radius $r_T$ and the trench width $\delta r_T$ are measured in microns (μm). The parameter MG is the number of mode groups supported by the core 30 based on a pure (i.e., undoped) silica cladding matrix 20 having a relative refractive index $\Delta_{CM}$=0. The parameter $\Delta\tau$ is the differential mode group delay in ps/m between the mode groups with the maximum and minimum group velocities. The parameter BW is the calculated modal bandwidth in units of GHz·km, calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983).

TABLE 4

Example multimode cores for $\lambda_p$ = 850 nm

| PAR | EXAMPLE 4.1 | EXAMPLE 4.2 | EXAMPLE 4.3 | EXAMPLE 4.4 |
|---|---|---|---|---|
| $\Delta_0$ (%) | 0.98 | 0.95 | 0.98 | 1.00 |
| $r_{CI}$ (μm) | 15.02 | 13.06 | 11.04 | 8.18 |
| α | 2.121 | 2.120 | 2.121 | 2.123 |
| $\Delta_{CL}$ (%) | 0 | 0 | 0 | 0 |
| $r_{CL}$ (μm) | 15.99 | 13.99 | 11.87 | 8.89 |
| $\delta r_{ICL}$ (μm) | 0.97 | 0.94 | 0.83 | 0.71 |
| $\Delta_T$ (%) | -0.38 | -0.40 | -0.43 | -0.50 |
| $r_T$ (μm) | 20 | 17.5 | 15 | 12 |
| $\delta r_T$ (μm) | 4.01 | 3.51 | 3.13 | 3.11 |
| $r_{CI}/r_{CL}$ | 0.94 | 0.93 | 0.93 | 0.92 |
| MG | 10 | 8 | 7 | 5 |
| $\Delta\tau$ (ps/m) | 0.009 | 0.014 | 0.006 | 0.007 |
| BW (GHz·km) | 31.9 | 34.9 | 36.4 | 34.8 |

TABLE 5

Example multimode cores for $\lambda_p$ = 980 nm

| PAR | EXAMPLE 5.1 | EXAMPLE 5.2 | EXAMPLE 5.3 | EXAMPLE 5.4 | EXAMPLE 5.5 |
|---|---|---|---|---|---|
| $\Delta_0$ (%) | 1.01 | 1.01 | 1.10 | 1.00 | 1.00 |
| $r_{CI}$ (μm) | 14.57 | 12.74 | 11.15 | 9.81 | 7.80 |
| α | 2.083 | 2.083 | 2.085 | 2.084 | 2.084 |
| $\Delta_{CL}$ (%) | 0 | 0 | 0 | 0 | 0 |
| $r_{CL}$ (μm) | 15.57 | 13.68 | 12.01 | 10.54 | 8.50 |
| $\delta r_{ICL}$ (μm) | 1.00 | 0.94 | 0.86 | 0.73 | 0.70 |
| $\Delta_T$ (%) | -0.40 | -0.45 | -0.50 | -0.40 | -0.50 |
| $r_T$ (μm) | 19 | 16.67 | 15 | 13 | 11 |
| $\delta r_T$ (μm) | 3.43 | 2.99 | 2.99 | 2.46 | 2.50 |
| $r_{CI}/r_{CL}$ | 0.94 | 0.93 | 0.93 | 0.93 | 0.92 |
| MG | 8 | 7 | 6 | 5 | 4 |
| $\Delta\tau$ (ps/m) | 0.009 | 0.007 | 0.006 | 0.008 | 0.008 |
| BW (MHz-km) | 33.7 | 36.7 | 37.8 | 33.8 | 53.9 |

TABLE 6

Example multimode cores for $\lambda_p$ = 1060 nm

| PAR | EXAMPLE 6.1 | EXAMPLE 6.2 | EXAMPLE 6.3 | EXAMPLE 6.4 |
|---|---|---|---|---|
| $\Delta_0$ (%) | 0.99 | 1.05 | 0.95 | 1.00 |
| $r_{CI}$ (μm) | 15.07 | 12.71 | 9.80 | 8.28 |
| α | 2.066 | 2.066 | 2.066 | 2.064 |
| $\Delta_{CL}$ (%) | 0 | 0 | 0 | 0 |
| $r_{CL}$ (μm) | 16.10 | 13.56 | 10.67 | 9.02 |
| $\delta r_{ICL}$ (μm) | 1.03 | 0.85 | 0.87 | 0.74 |
| $\Delta_T$ (%) | -0.38 | -0.38 | -0.48 | -0.50 |
| $r_T$ (μm) | 20 | 17 | 14 | 12 |
| $\delta r_T$ (μm) | 3.90 | 3.44 | 3.33 | 2.98 |
| $r_{CI}/r_{CL}$ | 0.94 | 0.94 | 0.92 | 0.92 |
| MG | 8 | 7 | 4 | 4 |
| $\Delta\tau$ (ps/m) | 0.009 | 0.013 | 0.007 | 0.024 |
| BW (MHz-km) | 30.5 | 40.7 | 54.1 | 43.5 |

TABLE 7

Example multimode cores for $\lambda_p$ = 1300 nm

| PAR | EXAMPLE 7.1 | EXAMPLE 7.2 | EXAMPLE 7.3 |
|---|---|---|---|
| $\Delta_0$ (%) | 1.01 | 0.96 | 0.96 |
| $r_{CI}$ (μm) | 14.56 | 12.06 | 9.20 |
| α | 2.027 | 2.026 | 2.024 |
| $\Delta_{CL}$ (%) | 0 | 0 | 0 |
| $r_{CL}$ (μm) | 15.61 | 12.98 | 9.97 |
| $\delta r_{ICL}$ (μm) | 1.05 | 0.92 | 0.77 |
| $\Delta_T$ (%) | -0.40 | -0.40 | -0.45 |
| $r_T$ (μm) | 19 | 16 | 13 |
| $\delta r_T$ (μm) | 3.39 | 3.02 | 3.03 |
| $r_{CI}/r_{CL}$ | 0.93 | 0.93 | 0.92 |
| MG | 6 | 4 | 3 |
| $\Delta\tau$ (ps/m) | 0.006 | 0.005 | 0.003 |
| BW (MHz-km) | 47.3 | 115.5 | 68.1 |

TABLE 8

Example multimode cores for $\lambda_p$ = 1550 nm

| Parameter | EXAMPLE 8.1 | EXAMPLE 8.2 | EXAMPLE 8.3 |
|---|---|---|---|
| $\Delta_0$ (%) | 0.98 | 0.96 | 0.96 |
| $r_{CI}$ (μm) | 15.51 | 12.17 | 9.20 |
| α | 1.995 | 1.993 | 1.992 |
| $\Delta_{CL}$ (%) | 0 | 0 | 0 |
| $r_{CL}$ (μm) | 16.55 | 13.16 | 9.92 |
| $\delta r_{ICL}$ (μm) | 1.05 | 0.99 | 0.72 |
| $\Delta_T$ (%) | -0.38 | -0.42 | -0.45 |
| $r_T$ (μm) | 20 | 16.5 | 13 |
| $\delta r_T$ (μm) | 3.45 | 3.34 | 3.08 |
| $r_{CI}/r_{CL}$ | 0.94 | 0.92 | 0.93 |
| MG | 5 | 3 | 2 |
| $\Delta\tau$ (ps/m) | 0.015 | 0.022 | 0.004 |
| BW (MHz-km) | 32.7 | 40.2 | 77.6 |

Figure 7:
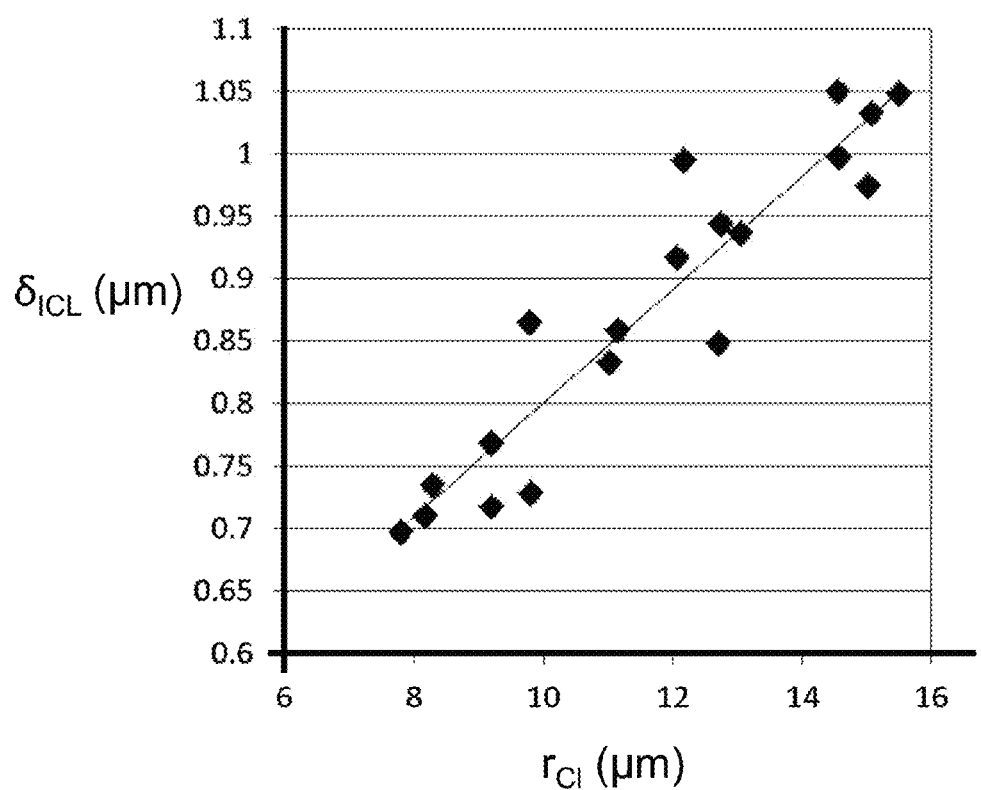
FIG. 7 is a plot of the inner cladding width $\delta r_{ICL}$ (μm) versus the core radius $r_{CI}$ (μm) for the nineteen different example cores described below.

FIG. 7 is a plot of the inner cladding width $\delta r_{ICL}$ (μm) versus the inner core radius $r_{CI}$ (μm) based on measurement data for the example cores as set forth above. The plot of FIG. 7 shows the dependence between the width $\delta r_{ICL}$ of inner cladding 33 and the radius $r_{CI}$ of the inner core 32 for the nineteen examples set forth in Tables 4 through 8. This linear dependence was unexpected and illustrates that core preforms with approximately the same ratio $\rho = r_{CI}/r_{CL}$ between the inner core and inner clad ratio ρ can be drawn into arbitrarily sized canes to make a multicore fiber 10 according to the disclosure. Tables 4 through 8 illustrate that exemplary ρ values can be between 0.9 and 0.95, or between 0.91 and 0.94, or between 0.92 and 0.94.

The optimum value of ρ and hence the width $\delta r_{ICL}$ of the inner cladding 33 also have a secondary dependence on the relative refractive index $\Delta_T$ of the trench. Analysis of the parameters in Tables 5 through 8 yields the relation $\delta r_{ICL-OPT}=0.053\, r_{CI}-0.586\, \Delta_T$. The multicore core 30 will have a high modal overfilled bandwidth if $|\delta r_{ICL}-\delta r_{ICL-OPT}|\leq 0.3$ µm, or $|\delta r_{ICL}-\delta r_{ICL-OPT}|\leq 0.2$ µm, or $|\delta r_{ICL}-\delta r_{ICL-OPT}|\leq 0.1$ µm.

Figure 8:
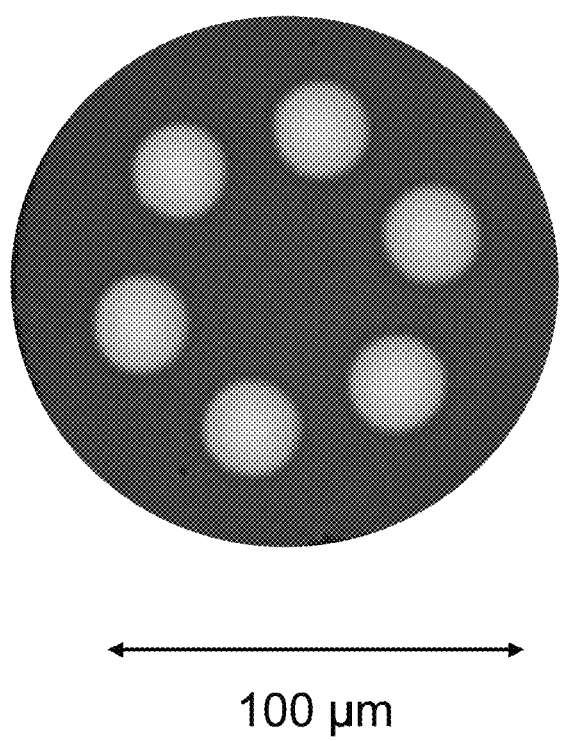
FIG. 8 is an end-on microscope image of an example multicore fiber that has six cores as shown in FIG. 5 and as set forth as Example 2.1, below.

FIG. 8 is an end-on microscope image of an example multicore fiber that has six cores as shown in FIG. 5 and as set above as Example 2.1. There are six cores 30 having an inner core 32 with an average diameter of $d_{CO}$=17.9 µm surrounded by an inner cladding 33 of width $\delta r_{ICL}$=1.2 µm and a trench 34 with width $\delta r_T$=3 µm. The average core pitch CP and average core axis radius RC were measured to be 34.56 µm and 34.54 µm, respectively. The outer diameter DM of the example multicore fiber 10 of FIG. 8 is 127.8 µm. The inner core has a maximum relative refractive index $\Delta_0$ of 0.99%, the inner cladding has an average relative refractive index of $\Delta_{CL}$=0.0%, and the trench has a relative refractive index of $\Delta_T$=−0.45%.

The attenuation of the six cores 30 of the example multicore fiber 10 of FIG. 8 was measured at 1310 nm using Optical Time Domain Reflectometry (OTDR), and the results are set forth in Table 6. The average attenuation at 1310 nm is 0.62 dB/km and is less than 0.7 dB/km for each core 30. The overfilled bandwidths of several of the cores 30 were measured at 850 nm and 1300 nm using a multimode launch fiber with a core diameter of 30 µm. The overfilled bandwidths at 850 nm ranged from 2700 MHz-km to 4350 MHz-km, with an average value of 3340 MHz-km. The overfilled bandwidths at 1300 nm ranged from 707 MHz-km to 844 MHz-km, with an average value of 774 MHz-km.

TABLE 6

Measured OTDR Attenuation

| | CORE NUMBER | | | | | |
|---|---|---|---|---|---|---|
| | Core 1 | Core 2 | Core 3 | Core 4 | Core 5 | Core 6 |
| Attenuation @ 1310 nm (dB/km) | 0.63 | 0.60 | 0.64 | 0.65 | 0.53 | 0.67 |

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A multicore optical fiber, comprising:
    a cladding matrix that defines a fiber axis and has a diameter DM in the range 120 µm≤DM≤220 µm;
    a plurality of N multimode cores wherein 2≤N≤10, with each core surrounded by the cladding matrix and having a central core axis that runs generally parallel to the fiber axis, the multimode cores being symmetrically arranged about the fiber axis with their central core axes at a radial distance RC and with no core running along the fiber axis and having a core pitch CP in the range 30 µm≤CP≤60 µm, with each multimode core having a core diameter $d_{CO}$ in the range 20 µm≤$d_{CO}$≤40 µm, a core α in the range 1.9≤α≤2.2 and a maximum core Δ of $\Delta_0$ in the range 0.6%≤$\Delta_0$≤1.9%; and
    wherein each multimode core includes an inner core having a radius $r_{CI}$ in the range 6 µm≤$r_{CI}$≤18 µm, the inner core being surrounded by a trench having a relative refractive index $\Delta_T$ in the range −0.7%≤$\Delta_T$≤0.1% and a width $\delta r_T$ in the range 1 µm≤$\delta r_T$≤6 µm, and wherein the trench is separated from the inner core by an inner cladding having a width $\delta r_{ICL}$ in the range 0.5 µm≤$\delta r_{ICL}$≤2 µm.

2. The multicore optical fiber according to claim 1, wherein the inner cladding has an optimum width $\delta r_{ICL}=\delta r_{ICL-OPT}=0.053\, r_{CI}-0.586\, \Delta_T$.

3. The multicore optical fiber according to claim 1, wherein 4≤N≤6.

4. The multicore optical fiber according to claim 1, further comprising an operating wavelength $\lambda_p$ in the range from 800 nm≤$\lambda_p$≤900 nm, and wherein 2.05≤α≤2.15.

5. The multicore optical fiber according to claim 1, further comprising an operating wavelength $\lambda_p$ in the range from 930 nm≤$\lambda_p$≤1,110 nm, and wherein 2.0≤α≤2.1.

6. The multicore optical fiber according to claim 1, further comprising an operating wavelength $\lambda_p$ in the range from 1,250 nm≤$\lambda_p$≤1,350 nm, and wherein 1.95≤α≤2.05.

7. The multicore optical fiber according to claim 1, further comprising an operating wavelength $\lambda_p$ in the range from 1,520 nm≤$\lambda_p$≤1,620 nm, and wherein 1.9≤α≤2.0.

8. The multicore optical fiber according to claim 1, wherein 0.9%≤$\Delta_0$≤1.1%.

9. The multicore optical fiber according to claim 1, wherein 0.75 µm≤$\delta r_{ICL}$≤2 µm.

10. The multicore optical fiber according to claim 1, wherein the multicore optical fiber has a bandwidth of greater than 2000 MHz-km.

11. A multicore optical fiber, comprising:
    a plurality of N multimode cores for 4≤N≤8 arranged symmetrically about a fiber axis and surrounded by a uniform silica cladding matrix having a diameter DM in the range 120 µm≤DM≤220 µm, with no core running along the fiber axis;
    each core having a central axis located at a radius RC from the fiber axis and having a core diameter $d_{CO}$ in the range 20 µm≤$d_{CO}$≤40 µm, a core α in the range 1.9≤α≤2.2, a maximum core Δ of $\Delta_0$ in the range 0.6%≤$\Delta_0$≤1.9%, the cores defining a pitch CP in the range 30 µm≤CP≤60 µm; and
    wherein each core includes an inner core, an inner cladding surrounding the inner core and a trench surrounding the inner cladding, wherein the inner core has a radius $r_{CI}$ in the range 6 µm≤$r_{CI}$≤18 µm.

12. The multicore optical fiber of claim 11, wherein the trench has a relative refractive index $\Delta_T$ in the range 0.7%≤$\Delta_T$≤−0.1% and a width $\delta r_T$ in the range 1 µm≤$\delta r_T$≤6 µm.

13. The multicore optical fiber of claim 12, wherein the inner cladding has a width $\delta r_{ICL}$ in the range 0.5 µm≤$\delta r_{ICL}$≤4 µm.

14. The multicore optical fiber of claim 13, wherein the inner cladding has a width $\delta r_{ICL}$ in the range 0.75 µm≤$\delta r_{ICL}$≤2 µm.

15. The multicore optical fiber of claim 11, wherein 0.9%≤$\Delta_0$≤1.1%.

16. The multicore optical fiber of claim 11, further comprising at least one outer coating that contacts and surrounds an outer surface of the cladding matrix.

17. A multicore optical fiber, consisting of:
    a plurality of N multimode cores for 4≤N≤8 arranged symmetrically about a fiber axis and surrounded by a uniform silica cladding matrix having a diameter DM in the range 120 µm≤DM≤220 µm;
    each core having a central axis located at a radius RC from the fiber axis and having a core diameter $d_{CO}$ in the range 20 µm≤$d_{CO}$≤40 µm, a core α in the range $1.9 \leq \alpha \leq 2.2$, a maximum core Δ of $\Delta_0$ in the range $0.6\% \leq \Delta_0 \leq 1.9\%$, the cores defining a pitch CP in the range 30 μm ≤ CP ≤ 60 μm; and wherein each core consists of an inner core, an inner cladding surrounding the inner core and a trench surrounding the inner cladding, wherein the inner core has a radius $r_{CI}$ in the range 6 μm ≤ $r_{CI}$ ≤ 18 μm.

18. The multicore optical fiber of claim 17, wherein the trench has a relative refractive index $\Delta_T$ in the range $-0.7\% \leq \Delta_T \leq -0.1\%$ and a width $\delta r_T$ in the range 1 μm ≤ $\delta r_T$ ≤ 6 μm.

19. The multicore optical fiber of claim 17, wherein the inner cladding has a width $\delta r_{ICL}$ in the range 0.5 μm ≤ $\delta r_{ICL}$ ≤ 4 μm and wherein $0.9\% \leq \Delta_0 \leq 1.1\%$.

* * * * *